S. L. Avery,

Windlass Brake,

No. 1,320 Reissued July 1, 1862.

Witnesses;
R. S. Spencer
C. M. Hughes

Inventor,
S. L. Avery
per Munn & Co
Attys.

UNITED STATES PATENT OFFICE.

STEPHEN L. AVERY, OF NORWICH, NEW YORK.

IMPROVEMENT IN WATER-ELEVATORS.

Specification forming part of Letters Patent No. 28,141, dated May 8, 1860; Reissue No. 1,320, dated July 1, 1862.

*To all whom it may concern:*

Be it known that I, STEPHEN L. AVERY, of Norwich, in the county of Chenango and State of New York, have invented a new and useful Improvement in Windlasses; and I do hereby declare that the following is a full and exact description thereof, reference being had to the accompanying drawings, which form a part of this specification.

Figure 1:
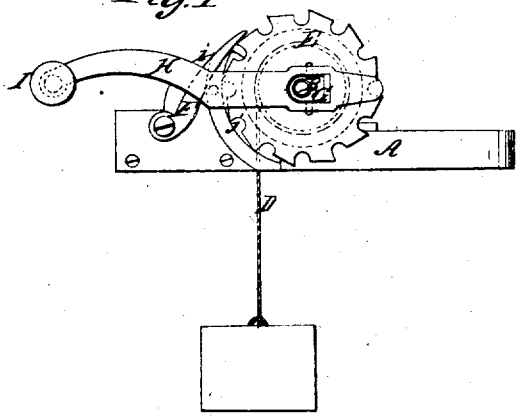
Figure 2:
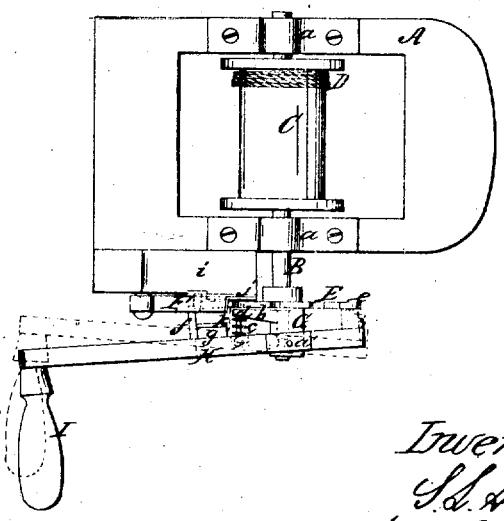

Figure 1 of said drawings is a side view of my improved windlass, and Fig. 2 is a top view of the same.

The same letters indicate corresponding parts in both figures.

My improvement in windlasses consists in providing the windlass-shaft with a loosely-jointed crank arranged in such a manner that it can be instantly coupled with or disconnected from the windlass-shaft, while it is also supplied with such attachments that the act of uncoupling the said crank from the windlass-shaft raises the pawl from the ratchet-wheel and at the same instant the said movement of the crank causes it to bring a friction-brake against the surface of a wheel upon the windlass-shaft, thereby enabling the said crank to serve the additional purpose of a brake-lever of such proportions that the operator is enabled to govern and control the reverse movements of the windlass-shaft, after relieving the same from the holding-power of the pawl and ratchet-wheel.

In the accompanying drawings, B is a windlass-shaft. E is a ratchet-wheel, secured to the outwardly-projecting end of the windlass-shaft. F is a pawl, the vibrating end of which rests upon the ratchet-wheel E. G is a collar, secured to the outer end of the windlass-shaft by means of a pin in the former working in a groove in the periphery of the latter, which enables the said collar to turn freely upon the end of the windlass-shaft while it is prevented from being removed from the same. H is the windlass-crank, which is jointed to the collar G in such a manner that it can be freely vibrated upon the same. *b* is an arm projecting at right angles from the collar G, and *d* is a pin projecting from the extremity of the said arm *b* into a recess in the inner side of the crank H, the said pin *d* serving the purpose of supporting the spiral spring *e*, which presses the handle end of the crank H to the position shown in the drawings, a position which forces the inwardly-projecting pin *e*, at the opposite end of said crank, into one of the notches of the ratchet-wheel and thereby couples the said crank with the windlass-shaft through the medium of the ratchet-wheel, which is rigidly secured to said windlass-shaft.

The pin *f*, which projects from the inner side of the crank H, and the leather-faced projection *g h* from the inner surface of the said crank, serve the following purposes—viz: The operator can at will force inward the handle end of the crank H and thereby bring the crank to the position shown by the red lines in Fig. 2, in which position the pin *e*, at the inner end of the crank, being withdrawn from its hold upon the ratchet-wheel, the said crank can be freely revolved independently of the windlass-shaft, a reverse movement of the said shaft in the meantime being prevented by the action of the pawl F upon the ratchet-wheel. It will, however, be perceived that when the crank is in the position shown in Fig. 1 a slight reverse movement of the same will cause the pin *f*, which projects therefrom, to lift the pawl from the ratchet-wheel; but if, at the instant of lifting the pawl from ratchet-wheel, the leather-faced projection *g h* on the inner face of the crank be pressed firmly against the outer surface of the ratchet-wheel E by means of the leverage force that the operator is enabled, through the medium of the crank, to bring to bear upon the same, the reverse movement of the windlass-shaft may be checked or controlled at the will of the operator.

This, my improved windlass, is therefore especially adapted for use in well-curbs and other apparatus for drawing water out of wells, as it enables the weight of the empty bucket to turn the windlass-shaft in a reverse direction, while the uncoupled crank during the said movement can be used as a brake-lever to prevent the too rapid descent of the bucket into the well, the said arrangement enabling an empty bucket to descend with safety much more rapidly into a well than could be accomplished by means of a reverse movement of the windlass-crank.

The frequent accidents and injuries produced by a rapid reverse movement of the crank in windlasses constructed upon the old plan would also be entirely prevented by the use of my said improved windlass.

I do not intend to limit myself to the precise form and arrangement of parts herein set forth, but shall vary the same as circumstances may require, while I employ a jointed crank in connection with a windlass-shaft in such a manner that the said crank can be instantly uncoupled from the windlass-shaft and as instantly be used as a brake-lever for the purpose of checking or controlling the reverse movement of said shaft.

What I claim as my invention, and desire to secure by Letters Patent, is—

1. Coupling a crank to any windlass-shaft in such a manner that the said crank can be instantly uncoupled from said shaft and then be used as a brake-lever for the purpose of checking or controlling the reverse movements of the said windlass-shaft, all substantially as herein set forth.

2. Arranging a crank with a windlass-shaft, a ratchet-wheel, and a pawl, in such a manner that the instant the said crank is uncoupled from the windlass-shaft a further action upon said crank will relieve the ratchet-wheel from the action of the pawl and also cause a friction-brake to so act upon the windlass-shaft as to check or control its reverse movements, all substantially as herein set forth.

The above specification of my improved brake attachment for windlasses signed and witnessed this 3d day of April, 1862.

STEPHEN L. AVERY.

Witnesses:
P. L. WESCOTT,
C. W. HENDY.